_United States Patent Office_

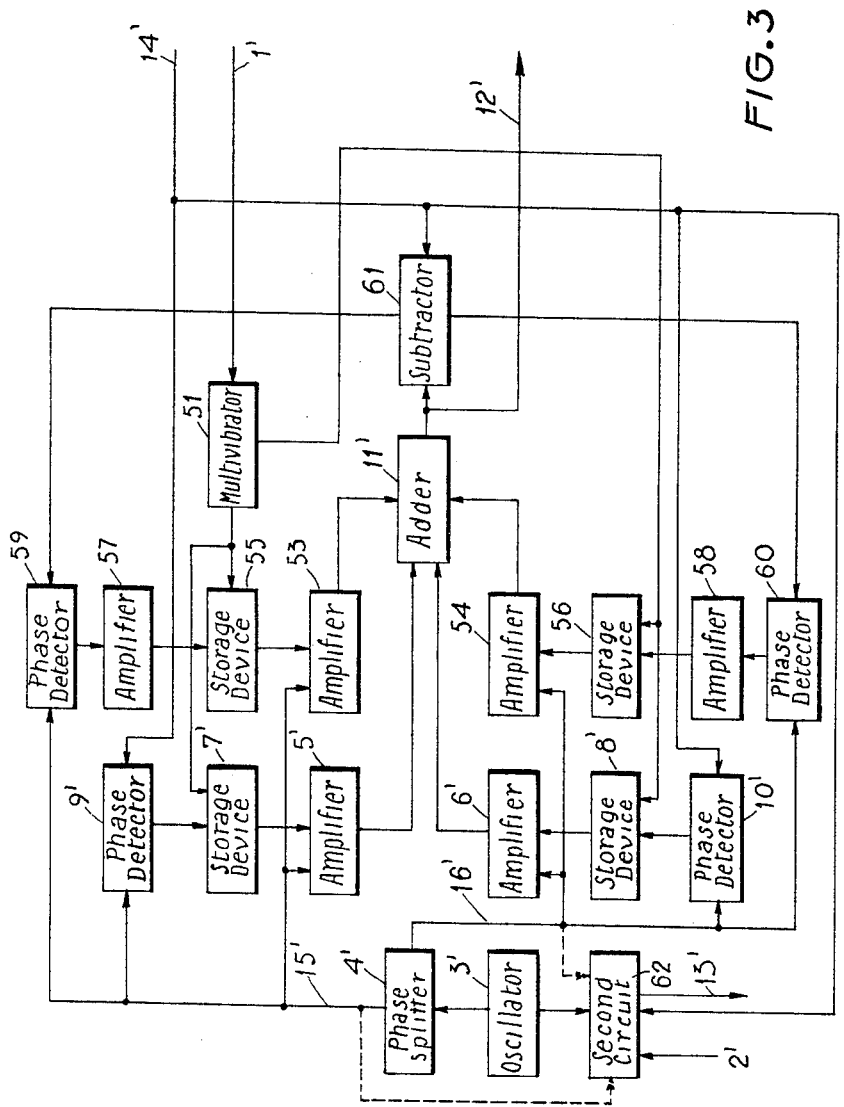

3,202,984
Patented Aug. 24, 1965

3,202,984
COHERENT SYSTEMS FOR TWO-PULSE
M.T.I. DEVICES
Guy Le Parquier, Paris, France, assignor to C.S.F.-
Compagnie Generale de Telegraphie Sans Fil, a corporation of France
Filed Nov. 15, 1962, Ser. No. 237,845
Claims priority, application France, Apr. 19, 1957, 736,855
3 Claims. (Cl. 343—5)

This patent application is a continuation-in-part of the patent application, Serial No. 727,308, filed April 9, 1958, for "Improvements in Coherent Systems for Two-Pulse M.T.I. Devices," now abandoned.

In certain moving target indicators (M.T.I.), more than one coherent oscillation is used. This is the case in the known radar system described in the United States Patent No. 3,031,659, where recurrent pairs of pulses are transmitted.

As each pulse of a pair must be compared in phase with its echo, and as the echoes of the first pulse of a pair have not yet been received at the instant when the second pulse of the pair is transmitted, two oscillations, respectively coherent with the two pulses of the pair, must be simultaneously available.

The obvious solution is the use of two coherent oscillators for providing respectively the two coherent oscillations, but the design of two oscillators, respectively coherent with two pulses and tuned to exactly the same frequency, is very critical.

It is an object of the present invention to eliminate such difficulties and, more generally, to derive from a single stable oscillator any number of oscillations respectively coherent with any number of pulses.

According to the invention, a sine wave and a cosine wave are derived, by means of a phase splitter, from a single stable oscillator, operating at the frequency of the desired coherent oscillations.

The oscillation coherent with any given pulse, for example the first pulse of a pair, is obtained through respectively multiplying said sine wave and said cosine wave by two factors, respectively proportional to the cosine and sine of the phase shift between said sine wave and said pulse, by means of circuits including storage devices, and then added together, this addition resulting in a single wave having the desired frequency and phase.

The invention will be best understood by means of the following description and appended drawing, wherein:

FIG. 3 is an improved modification of the circuit of FIG. 1.

The invention will be described as applied to a radar system of the type described in the aforementioned patent, wherein the radar transmitter transmits recurrent pairs of pulses, the time interval between two pairs being much longer than the time interval between the two pulses of a pair.

According to known art, the transmission of the first and second radar pulses of the successive pairs is synchronized by means of first and second synchronizing pulses. Moreover as, also according to known art, the phase comparison between a transmitted pulse and its echo is preferably effected at the intermediate frequency of the receiver, a corresponding intermediate frequency pulse is derived from each transmitted pulse by means of a frequency converter which is fed by the local oscillator of the radar receiver.

For short, those intermediate frequency pulses corresponding respectively to the first and second pulses of each pair will be henceforth referred to as "first IF pulse" and "second IF pulse."

Figure 1:
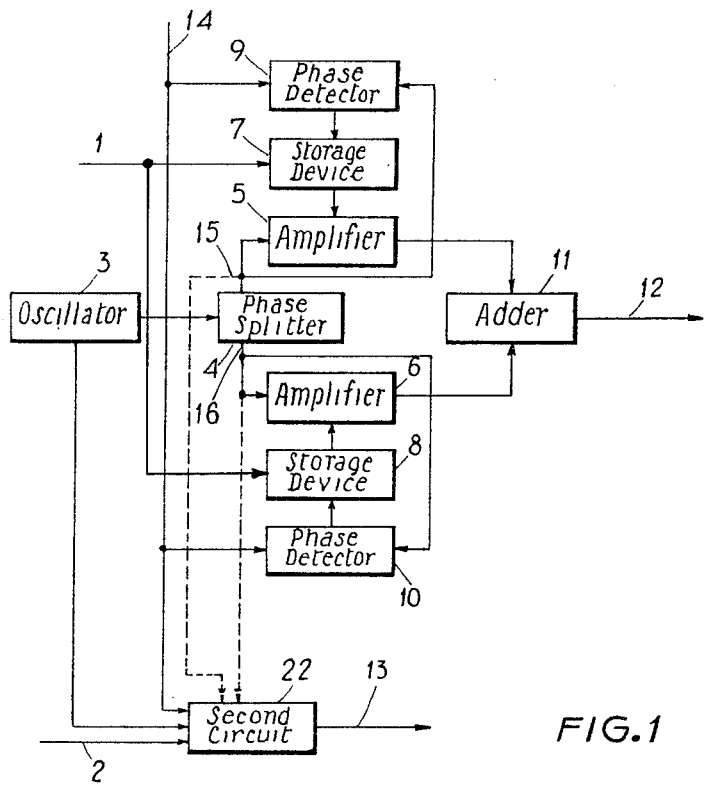
FIG. 1 is a circuit according to the invention for deriving two coherent oscillations from a single stable oscillator.

The circuit of FIG. 1 comprises three inputs: 1, 2 and 14, the successive IF pulses being applied to input 14, and the first and second synchronizing pulses respectively to inputs 1 and 2.

Oscillator 3 is a stable oscillator whose frequency is equal to the intermediate frequency of the receiver.

It feeds a phase splitter 4 having two outputs 15 and 16 respectively delivering a sine wave $A \sin \omega t$ and a cosine wave $A \cos \omega t$, where A is a constant.

Output 15 is connected in parallel to the signal input of a variable gain amplifier 5 and to the first input of a phase detector 9, while output 16 is connected in parallel to the signal input of a variable gain amplifier 6 and to the first input of a phase detector 10.

Input 14 is connected in parallel to the second inputs of phase detectors 9 and 10.

Amplifiers 5 and 6 have respective gain control inputs and their gain may be varied between a positive value and a negative value. A detailed embodiment of a suitable amplifier of this type will be described later with reference to FIG. 2.

The memory or storage devices 7 and 8 have respective control inputs connected in parallel to the input 1 of the circuit, respective signal inputs respectively coupled to the outputs of phase detectors 9 and 10, and respective outputs respectively connected to the gain control inputs of amplifiers 5 and 6.

Each of the storage devices 7 and 8 is of the type allowing a signal applied to its signal input to be registered only when a control or selecting pulse is applied to its control input. The output signal of the storage device varies in accordance with the variations, if any, of the input signal as long as said control pulse is applied; thereafter, it keeps the value it had at the end of the control pulse, until another control pulse is applied and another signal may be registered.

Storage devices 7 and 8 may be, for example, of the type described and shown in "Waveforms," M.T.I. Radiation Laboratory Series, first edition, pages 519 and 520, Figs. 14–24.

The outputs of amplifiers 5 and 6 respectively feed the two inputs of an adding circuit 11, whose output 12 constitutes one output of the circuit of FIG. 1.

The elements described heretofore allow an oscillation coherent with the first IF pulse to be formed and appear at output 12 in the following manner:

When a first synchronizing pulse, i.e. a synchronizing pulse for the first pulse of a pair of radar pulses, appears at input 1, the corresponding IF pulse simultaneously appears at input 14, with a phase $(\omega t + \varphi 1)$, where $\varphi 1$ is a random constant, and a constant amplitude B.

Phase detector 9, which receives on its first input the sine wave $A \sin \omega t$ thus delivers an output signal $C \cos \varphi 1$ having the duration of the IF pulse, C being a constant independent of $\varphi 1$. In th same way, phase detector 10, which receives on its first input the cosine wave $A \cos \omega t$, delivers an output signal $C \sin \varphi 1$.

Storage devices 7 and 8 are on the other hand unblocked by the synchronizing pulse corresponding to the first transmitted pulse and store thus signals respectively proportional to $\cos \varphi 1$ and $\sin \varphi 1$.

It is to be noted that the second IF pulse of the same pair also gives rise to output signals of phases detectors 9 and 10, but that the latter are not stored in the storage devices 7 and 8 which, at that time, receive no pulse on their control inputs, inasmuch as the second synchronizing pulse corresponding to the second radar pulse, appears at input 2 and not at input 1.

The output signals of storage devices 7 and 8 are respectively applied to the control inputs of amplifiers 5 and 6, to make their gains respectively proportional to cos $\varphi1$ and sin $\varphi1$.

At the two inputs of adder 11, there are thus obtained respectively the two waves $K \cos \varphi1 \sin \omega t$ and $K \sin \varphi1 \cos \omega t$, where K is a common constant.

The signal at the output 12 of adder 11 may be written $$K (\sin \omega t \cos \varphi1 + \cos \omega t \sin \varphi1) = K \sin (\omega t + \varphi1)$$

i.e. constitutes the first desired coherent oscillation.

The circuit for deriving from oscillator 3 the oscillation $K \sin (\omega t + \varphi2)$ coherent with the second IF pulse of each transmitted pair, having a phase $(\omega t + \varphi2)$, is identical to the first circuit supplying the first coherent oscillation, except that its storage devices are unblocked by the second synchronizing pulses applied to input 2. This circuit has therefore been globally represented as second circuit 22, connected to input 2, to oscillator 3, and to the input 14 which supplies the IF pulses. It delivers at its output 13 the second coherent oscillation. It is of course possible to use not only the same stable oscillator 3, but also the same phase splitter 4 for the two circuits, if this is preferred. In that case, the connection between oscillator 3 and circuit 22 must be substituted by the connections in dotted lines connecting circuit 22 to the two outputs of phase splitter 4. It would also be possible to use the same phase detectors for the two circuits.

Figure 2:
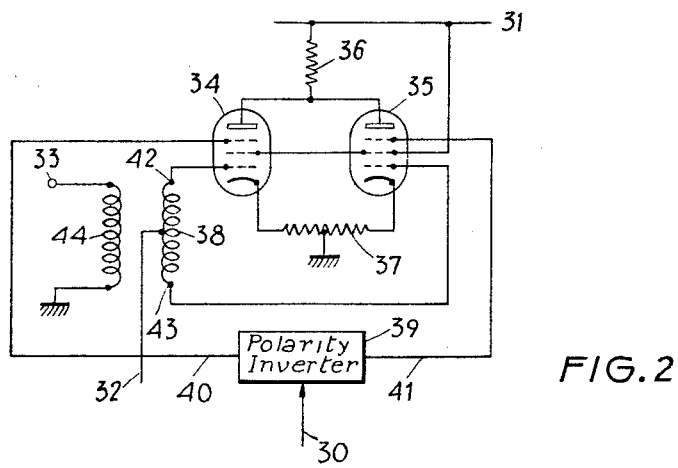
FIG. 2 is a detail of FIGS. 1 and 3.

FIG. 2 shows by way of example a possible embodiment of each of the variable gain amplifiers 5 and 6 of FIG. 1.

The amplifier comprises two mixing tubes of the pentode type, 34 and 35, whose plates are connected in parallel to terminal 31 of a positive voltage source through a common resistor 36. The cathodes of the two pentodes are connected by a resistor 37 whose middle point is grounded. The first grids of the two tubes are connected to the two terminals 42 and 43 of a coil 38 whose middle point is connected to a terminal 32 of a bias voltage source, and their second grids are connected to terminal 31. The amplifier further comprises a conventional polarity inverting, and if desired, multiplying circuit 39, supplying on its first output 40 a signal of the same polarity as the signal applied to its input 30 and on its other output 41 a signal of the other polarity, both output signals having the same absolute value, equal to, or proportional to the absolute value of the input signal.

Output 40 and output 41 are respectively connected to the third grids of tubes 34 and 35.

The amplifier further comprises an input coil 44, inductively coupled to coil 38 and having a first terminal 33 and second terminal which is grounded.

The output of the amplifier is across resistor 36.

Considering for example amplifier 5, it operates as follows:

The sine wave $A \sin \omega t$ is applied to input coil 44, so that the first control grids of pentodes 34 and 35 respectively receive signals proportional to $\sin \omega t$ and $-\sin \omega t$.

The output signal of storage device 7, which is proportional to $\cos \varphi1$, is applied to the input 30 of circuit 39, so that the third grids of tubes 34 and 35 receive signals respectively proportional to $\cos \varphi1$ and $-\cos \varphi1$.

The bias voltage applied to the middle point of coil 38 is such that, if $\cos \varphi1$ is positive, tube 35 is blocked, while tube 34 supplies an output signal proportional to $\sin \omega t \cos \varphi1$. If $\cos \varphi1$ is negative, tube 34 is blocked, while tube 35 supplies an output signal equal to $(-\sin \omega t)(-\cos \varphi1)$, i.e. a signal again proportional to $\sin \omega t \cos \varphi1$. In any case, there is thus obtained across resistor 36 an output signal which is equal to $\sin \omega t \cos \varphi1$ to within a constant factor, independent of $\varphi1$.

The system of FIG. 1 gives the correct coherent wave if the elements of the circuit operate correctly, but does not include any means for correcting a misadjustment of any of the elements.

The more elaborate circuit of FIG. 3 comprises an automatic correction circuit.

In this figure, inputs 1', 2' and 14' respectively receive the same signals as inputs 1, 2 and 14 of FIG. 1, while oscillator 3', phase splitter 4', with outputs 15' and 16', amplifiers 5' and 6', storage devices 7' and 8', phase detectors 9' and 10' are the same, and are connected in the same manner, as the corresponding elements 3, 4, 5, 6, 7, 8, 9 and 10 of FIG. 1, with this difference that the control inputs of storage devices 7' and 8' are connected to input 1' through a monostable multivibrator 51, the duration of the unstable state of which is equal to, or preferably, very slightly less than the duration of an IF pulse.

Moreover the outputs of amplifiers 5' and 6' are connected to the first two inputs of a four-input adding circuit 11', having an output 12'.

Each first IF pulse, when applied to input 1', trips the multivibrator 51 into its unstable state, so that storage devices 7' and 8' are unblocked for a duration equal to or slightly less than the duration of an IF pulse. Inasmuch as, during that time, the output signals of phase detectors 9' and 10' are constant, the operation of the circuit described heretofore, assuming the last two inputs of adder 11' to be disconnected, would be the same as the operation of the first circuit of the system FIG. 1, id. output 12' would supply the same signal as in the case of FIG. 1.

The first circuit of the system of FIG. 3 comprises further the following elements:

A subtractor 61 having its first input connected to the output of adder 11', and its other input connected to input 14';

Phase detectors 59 and 60 having their first inputs respectively connected to outputs 15' and 16' of phase splitter 4', and their second inputs connected to two outputs (supplying the same signal) of subtractor 61, and respective outputs respectively connected to the inputs of conventional high gain amplifiers 57 and 58;

Storage devices 55 and 56 having respective control inputs connected to the output of multivibrator 51, respective signal inputs respectively connected to the outputs of amplifiers 57 and 58, and respective outputs respectively connected to the control inputs of variable gain amplifiers 54 and 55.

The latter amplifiers respectively receive on their signal inputs the $A \sin \omega t$ wave and the $A \cos \omega t$ wave from output 15' and 16' of phase splitter 4', while their outputs are connected to the third and fourth inputs of adder 11'.

Storage devices 55 and 56 are of the same type as storage devices 7' and 8', except that delay devices are inserted in their respective control inputs so as to delay slightly the action of the control signals applied thereto.

Amplifiers 54 and 55 are of the same type as amplifiers 5' and 6'.

The operation of the system is as follows:

From what was said before results that if the operation of the elements contributing to the formation of the signals appearing on the first two inputs of adder 11' is correct, then these two inputs respectively receive signals $K \sin \omega t \cos \varphi1$ and $K \cos \omega t \sin \varphi1$. It has been moreover, assumed in the present example, in order to simplify the writing of the mathematical expressions, that the constants of the circuits feeding those two inputs are such that K equals precisely B. The two signals are therefore, if correct $B \sin \omega t \cos \varphi1$ and $B \cos \omega t \sin \varphi1$.

If they are not correct, they may be generally written, considering the causes of error which might actually occur, as $B \sin \omega t \cos \varphi1 + p \sin \omega t$ and $B \cos \omega t \varphi1 + q \cos \omega t$, where $p \sin \omega t$ and $q \cos \omega t$ are error terms.

The third and fourth inputs of adder 11', respectively connected to amplifiers 53 and 54, are designed to be fed respectively with a $\sin \omega t$ term and a $\cos \omega t$ term compensating the aforementioned error terms, and this is why these two variable gain amplifiers 53 and 54 respectively receive on their respective signal inputs the waves A sin ωt and A cos ωt from phase splitter 4'.

Those two amplifiers are inserted in respective feedback loops, both comprising subtractor 61 which receives on its first input the coherent wave, delivered by adder 11', whose instantaneous desired value is B sin (ωt+φ1) and on its second input the IF pulse, whose instantaneous value is effectively $\bar{B}$ sin (ωt+φ1).

(Of course, if K had not been chosen equal to B, the subtractive comparison could still be effected through amplifying either the output signal of adder 11' or the IF pulse to bring them to the same nominal level.)

Calling $-r$ sin ωt and $-s$ cos ωt the signals instantaneously applied to the third and fourth inputs of adder 11', it will be readily seen that the error signal delivered by subtractor 61, is:

$$E = e \sin \omega t + e' \cos \omega t$$

where $e = p - r$, and $e' = q - s$.

Signal E is applied to the second inputs of both phase detector 59 and phase detector 60. As phase detector 59 receives on its first input the sine wave A sin ωt and phase detector 60 the cosine wave A cos ωt, only the first term of error signal E will contribute to the output signal of phase detector 59, and only the second term of error signal E to the output signal of phase detector 60. Phase detectors 59 and 60 operate for example through multiplying between them their two input signals and filtering the continuous component of the product; the sin ωt cos ωt term will then give a zero mean value, and phase detector 59 will supply an output signal $ke$ proportional to $e$, while phase detector 60 supplies an output signal $ke'$ proportional to $e'$, K being a constant independent of $e$ and $e'$.

Those signals are respectively multiplied by amplifiers 57 and 58 of high negative gain $-G$, and applied to the control inputs of variable gain amplifiers 53 and 54 through the storage devices 55 and 56, as soon as the latter have been unblocked, which happens only a very short time (a small fraction of the duration of an IF pulse) after the front of the new first IF pulse has appeared at input 14'.

Amplifiers 53 and 54 thus feed to the third and fourth inputs of added 11' respective signals $$-kGe \sin \omega t \text{ and } -kGe' \cos \omega t$$

When a state of equilibrium has been reached, $$-r \sin \omega t = -kGe \sin \omega t$$
$$-s \cos \omega t = -kGe' \cos \omega t$$

or, as $r = p - e$, and $s = q - e'$:

$$p - e = kGe$$
$$q - e' = kge'$$

from which:

$$e = p/(1+kG)$$
$$e' = q/(1+kG)$$

the final error signals $e$ and $e'$ may thus be made very small.

After the end of the IF pulse, this state of things is maintained through the final signals which are stored in the storage devices and lasts until the appearance of another first IF pulse.

The slight delaying imposed on the action exerted by the output signals of multivibrator 51 on storage devices 55 and 56 has the following reason:

When a new first IF pulse appears at input 14', a very short time elapses during which subtractor 61 still receives from adder 11' the oscillation coherent with the preceding first IF pulse while its second input already receives the new first IF pulse. This could result in a signal E which would saturate the feedback loops, if a precaution of this kind, or another equivalent measure, had not been taken.

The second circuit delivering the oscillation coherent with the second IF pulse is identical to the first circuit, except that its storage devices are controlled through a multivibrator triggered by the second synchronizing pulses appearing at input 2'. It has therefore been represented globally as "second circuit 22", connected to inputs 2' and 14', and also either to oscillator 3' or to the two outputs of phase splitter 14', the latter connections being shown in dotted lines.

What is claimed is:

1. A circuit, for radar systems in which first and second pulses of recurrent pairs of pulses are transmitted and associated respectively with first and second synchronizing pulses and which comprise a single stable oscillator, said circuit comprising: means for deriving from said single oscillator a first and a second wave respectively coherent with said first and second pulses of said recurrent pairs of radar pulses, said means comprising two portions respectively associated with said first and second radar pulses for respectively delivering said first and second coherent waves; each of said portions comprising: a phase splitter having an input coupled to said oscillator, and a first and a second output for respectively delivering a sine wave and a cosine wave; a first phase detector having a first input coupled to said first output of said phase splitter, a second input, and an output; a second phase detector having a first input coupled to said second output of said phase splitter, a second input and an output; means for applying at least said radar pulses associated with said portion to said second inputs of said first and second phase detectors; first and second storage means having respective signal inputs respectively connected to said outputs of said first and second phase detectors, respective control inputs, and respective outputs; means for applying only those of said synchronizing pulses which are associated with said radar pulses associated with said portion to said control inputs of said first and second storage means; first and second variable gain amplifiers having respective signal inputs respectively connected to said first and second outputs of said phase splitter, respective control inputs respectively connected to said outputs of said first and second storage means, and respective outputs; and an adding circuit having a first and a second input respectively connected to said outputs of said first and second amplifiers, and an output for delivering said coherent wave associated with said radar pulses.

2. A circuit, for radar systems in which first and second pulses of recurrent pairs of pulses are transmitted and associated respectively with first and second synchronizing pulses and which comprise a single stable oscillator, said circuit comprising: means for deriving from said single oscillator a first and a second wave respectively coherent with said first and second pulses of said recurrent pairs of radar pulses, said means comprising two portions respectively associated with said first and second radar pulses for respectively delivering said first and second coherent waves; each of said portions comprising: a phase splitter having an input coupled to said oscillator, and a first and a second output for respectively delivering a sine wave and a cosine wave; a first phase detector having a first input coupled to said first output of said phase splitter, a second input, and an output; a second phase detector having a first input coupled to said second output of said phase splitter, a second input and an output; means for applying at least said radar pulses associated with said portion to said second inputs of said first and second phase detectors; first and second storage means having respective signal inputs respectively connected to said outputs of said first and second phase detectors, respective control inputs, and respective outputs; first and second variable gain amplifiers having respective signal inputs respectively connected to said first and second outputs of said phase splitter, respective control inputs respectively connected to said outputs of said first and second storage means, and respective outputs; an adding circuit having a first and a second input respectively coupled to said outputs of said first and second variable gain amplifiers, a third and a fourth input, and an output; a subtractor having a first input coupled to said output of said adding circuit, a second input and an output; means for applying at least said radar pulses associated with said portion to said second input of said subtractor; a third and a fourth phase detector having respective first inputs respectively coupled to said first and second outputs of said phase splitter, respective second inputs coupled to said output of said subtractor, and respective outputs; a first and a second high gain amplifier having respective inputs respectively coupled to said outputs of said third and fourth phase detectors and respective outputs; third and fourth storage means having respective signal inputs respectively coupled to said outputs of said first and second high gain amplifiers, respective control inputs, and respective outputs respectively coupled to said third and fourth inputs of said adding circuit; a monostable multivibrator having an input and an output; means for applying only those of said synchronizing pulses which are associated with said radar pulses associated with said portion to said multivibrator input; and means for coupling said multivibrtor output of said control inputs of said first, second, third and fourth storage means.

3. A circuit for deriving from a stable oscillator oscillating at a predetermined frequency a wave which is coherent with a pulse constituted by a train of oscillations having said frequency and a random phase relative to said oscillator, said circuit comprising: a stable oscillator, a phase splitter for deriving from said oscillator a first sine wave and a first cosine wave at said predetermined frequency; first and second phase detecting means fed with said pulse and respectively with said sine wave and said cosine wave for deriving first and second signals respectively representative of the cosine and the sine of the phase shift between said train of oscillations and said sine wave; first and second storage means for respectively storing said first and second signals; first and second variables gain amplifying means, respectively controlled by said first and second storage means, and respectively fed with said first sine and cosine waves for respectively delivering second sine and cosine waves; and adding means fed with said second sine and cosine waves.

No references cited.

CHESTER L. JUSTUS, *Primary Examiner.*